(12) United States Patent
Mercat et al.

(10) Patent No.: US 7,959,236 B2
(45) Date of Patent: Jun. 14, 2011

(54) WHEEL RIM AND METHOD OF MANUFACTURE THEREOF, AND BICYCLE INCLUDING SUCH RIM

(75) Inventors: Jean-Pierre Mercat, Chavanod (FR); Olivier Mouzin, Montmin (FR)

(73) Assignee: Salomon S.A.S., Metz-Tessy (FR)

( * ) Notice: Subject to any disclaimer, the term of this patent is extended or adjusted under 35 U.S.C. 154(b) by 82 days.

(21) Appl. No.: 11/348,366

(22) Filed: Feb. 7, 2006

(65) Prior Publication Data

US 2006/0181140 A1 Aug. 17, 2006

(30) Foreign Application Priority Data

Feb. 8, 2005 (FR) .................................. 05 01235

(51) Int. Cl.
*B60B 25/00* (2006.01)
*B60B 21/02* (2006.01)
(52) U.S. Cl. ......... 301/95.102; 301/95.106; 301/95.107; 152/381.6
(58) Field of Classification Search .................... 301/55, 301/58, 95.101–95.102, 95.104–95.107; 152/379.3–379.5, 381.3, 381.4, 381.6, DIG. 20
See application file for complete search history.

(56) References Cited

U.S. PATENT DOCUMENTS

| | | | |
|---|---|---|---|
| 4,418,164 A * | 11/1983 | Logullo et al. ................. | 523/207 |
| 5,540,485 A | 7/1996 | Enders | |
| 5,651,591 A | 7/1997 | Mercat et al. | |
| 5,820,709 A * | 10/1998 | Matsuda ........................ | 152/501 |
| 5,941,606 A * | 8/1999 | Chen ................................ | 301/30 |
| 6,216,758 B1 * | 4/2001 | Chen .......................... | 152/379.4 |
| 6,224,165 B1 | 5/2001 | Mercat et al. | |
| 6,257,676 B1 | 7/2001 | Lacombe et al. | |
| 6,402,256 B1 | 6/2002 | Mercat | |
| 6,767,070 B1 | 7/2004 | Chiang et al. | |
| 6,926,370 B2 * | 8/2005 | Spoelstra ................. | 301/64.703 |
| 2005/0062337 A1 * | 3/2005 | Meggiolan et al. ...... | 301/95.102 |

FOREIGN PATENT DOCUMENTS

| | | |
|---|---|---|
| EP | 0 714 792 A1 | 6/1996 |
| EP | 0 715 001 A1 | 6/1996 |
| EP | 0 818 328 A1 | 1/1998 |
| EP | 0 893 280 A1 | 1/1999 |
| EP | 1 084 868 A1 | 3/2001 |

OTHER PUBLICATIONS

Search Report from counterpart application EP 06 00 2037.7, including English language translation of Written Opinion.

\* cited by examiner

*Primary Examiner* — Jason R Bellinger
(74) *Attorney, Agent, or Firm* — Greenblum & Bernstein, P.L.C.

(57) ABSTRACT

A rim for a cycle wheel that includes an annular shaped element, as well as a bicycle that includes such rim and a method of making the rim. The annular shaped element has at least one groove, with the element being encircled by at least one binding of polymerizable resin-coated fiber housed in the groove. In the manufacturing method the fiber winding is wound on the annular shaped element or the fiber winding is first made and then, second, it is placed in a recess of the rim.

53 Claims, 13 Drawing Sheets

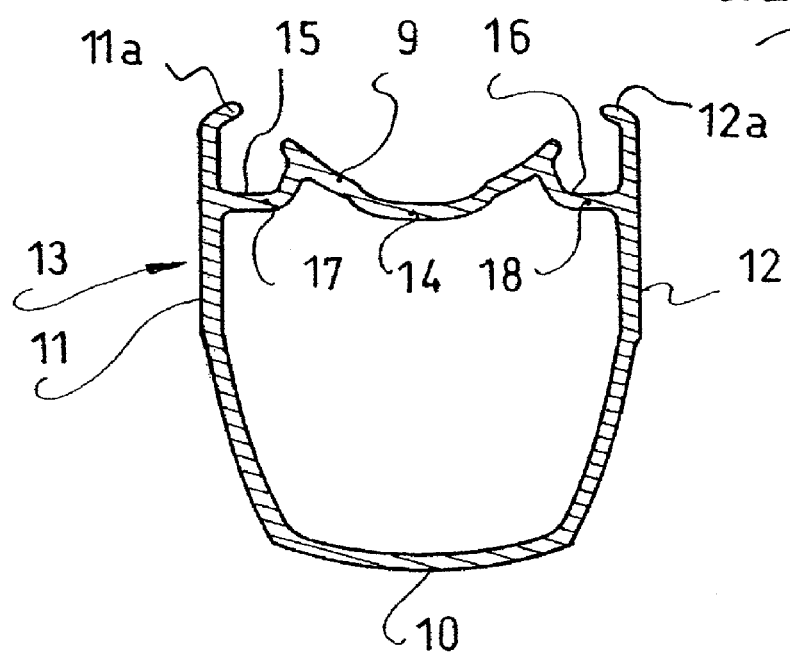
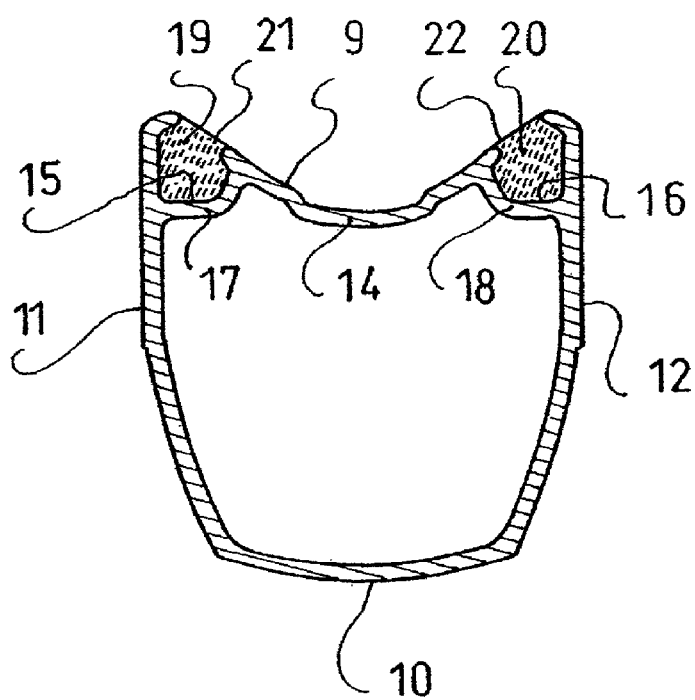

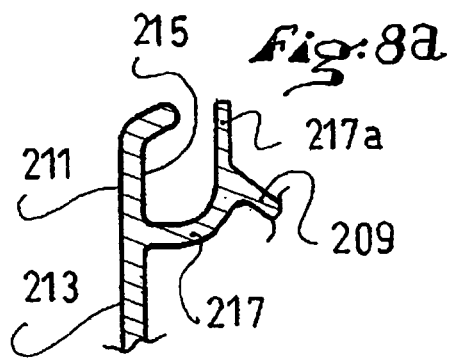
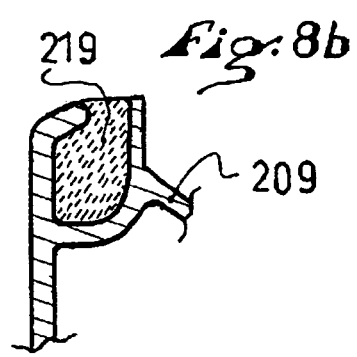
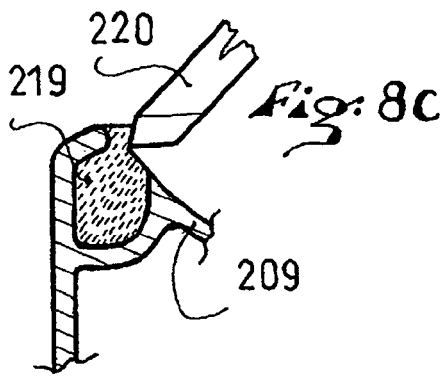
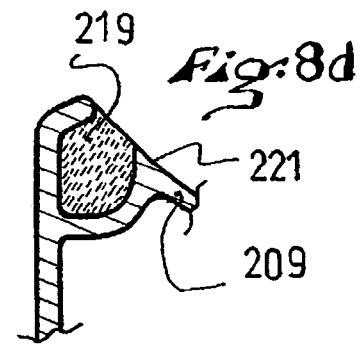
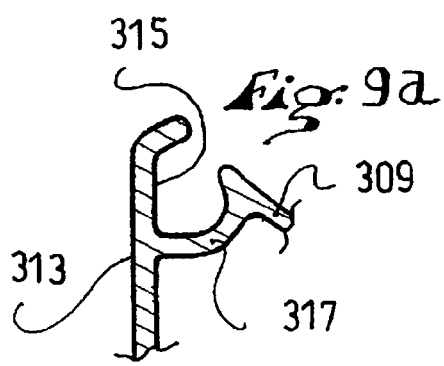
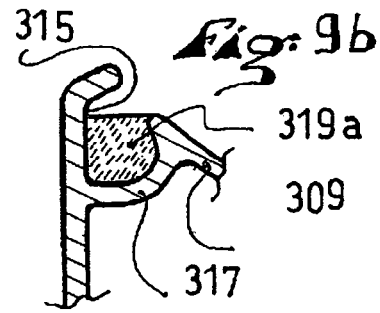
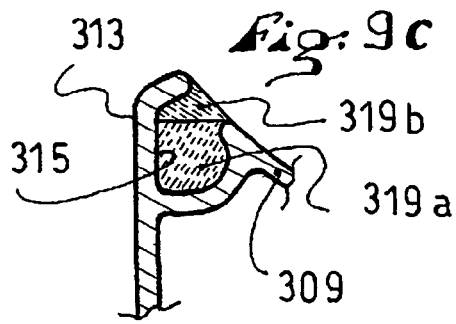

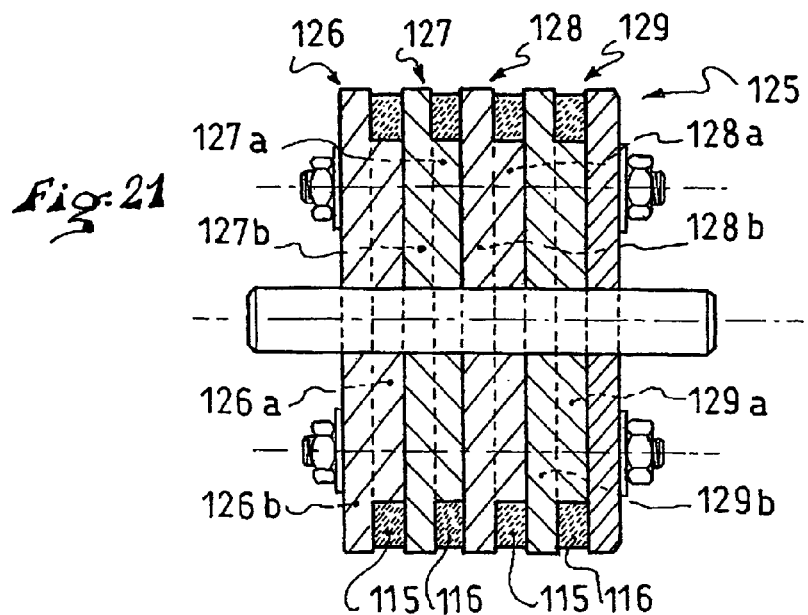
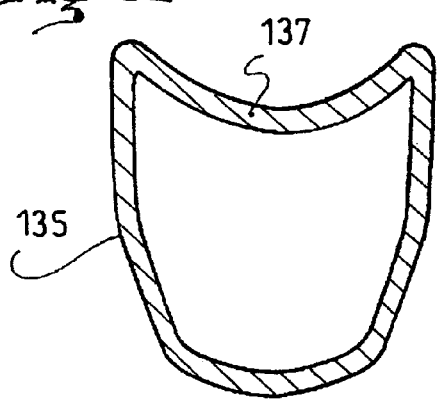
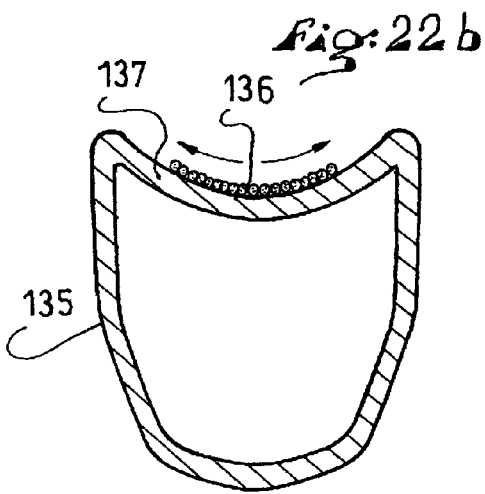
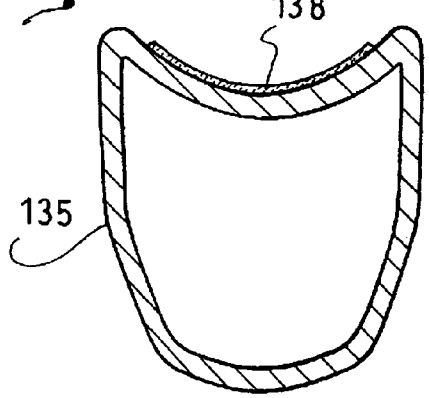

WHEEL RIM AND METHOD OF MANUFACTURE THEREOF, AND BICYCLE INCLUDING SUCH RIM

CROSS-REFERENCE TO RELATED APPLICATION

This application claims priority under 35 U.S.C. §119 of French Patent Application No. 05.01235, filed on Feb. 8, 2005, the disclosure of which is hereby incorporated by reference thereto in its entirety.

BACKGROUND OF THE INVENTION

1. Field of the Invention

The invention relates to a wheel rim for a wheeled apparatus. More particularly, the invention relates to a wheel rim for a bicycle. The invention also relates to a wheel for a wheeled apparatus including the aforementioned rim, as well as to a method of manufacturing the rim.

2. Description of Background and Relevant Information

As is known, a rim for a bicycle wheel is formed as an annular profile having, inwardly, means for fastening compression spokes or tension spokes and, outwardly, an open channel for receiving a tire and, if necessary, a tube.

In a conventional spoke wheel, the rim represents about 60% of the weight of the wheel (for a front wheel) and 90% of the inertia.

Understandably, such circumstances have led manufacturers to the design of rims that are lightweight and rigid.

It should be noted, however, that the rim is a part of the bicycle that is subject to substantial forces. Indeed, with the exception of the tire; the rim is the component that is the closest to the ground and which, after the tire, is exposed to the ground unevenness and transmits the same to the remainder of the bicycle. If the tire is inadequately inflated, the rim can come in direct contact with the ground.

Moreover, the tire subjects the rim to high stresses due to its inflation pressure.

During a ride, each wheel rotation creates a load on each of the spokes, thereby causing mechanical fatigue cycles. The rim is reactionally subject to these fatigue cycles; therefore, it must be sufficiently strong to withstand these forces that can cause fatigue.

Finally, when braking, the rim must dissipate the heat generated by the friction of the pads, in the area of the lateral flanges of the rim.

The design of a rim must take into account all of the above-mentioned forces.

Generally speaking, the profile used for making a rim is characterized by its rigidity and strength.

Rigidity characterizes the more or less pronounced aptitude to elastic deformation. The rigidity of a material is evaluated by its modulus of elasticity (E). The higher the modulus, the more rigid the profile, and the less it deforms under a given load. The rigidity of a profile is evaluated by the product (ExI) of its modulus of elasticity E multiplied by the quadratic inertia (or moment) I of the profile.

Strength characterizes the solidity of the profile, that is, the maximum load which the profile can withstand prior to irreversible deformation, or the maximum load prior to breaking.

Furthermore, rigidity and strength are characterized along two preferred directions, i.e., first, the frontal direction for any force that tends to deform the rim in the plane that it defines, and second, the lateral direction for any force that tends to deform the rim transversely with respect to the plane that it defines.

In the field of bicycles, there are two large families of rims, rims for glued/cemented tubular tires and rims for pneumatic tires, the tires either requiring a tube or being tubeless.

Furthermore, two types of materials are normally used for the rims, namely, metal, such as steel in the past and an aluminum alloy currently, sometimes magnesium or titanium, on the one hand, and composite materials, more particularly carbon fibers, aramid fibers, or glass fibers embedded in a resin matrix, on the other hand.

The currently available aluminum alloy rims are economical, and they are well adapted to braking due to their friction and heat conduction properties.

In the field of aluminum alloy rims, developments have been undertaken with the goal of reducing the weight of the rims.

In this regard, the three documents EP714792 (and family member U.S. Pat. No. 5,651,591); EP715001; and EP1084868 (and family member U.S. Pat. No. 6,402,256) disclose lighter rims. In the first case, the particular shape of the rim casing makes it possible to reduce the thickness of the lower bridge. In the second case, the use of a higher performance alloy produces a rim with reduced weight following a chemical treatment that generally reduces the material thickness. In the third case, the lower bridge is machined between the zones for fastening the spokes so as to reduce the thickness of the bridge in these zones where the stresses have been observed to be relatively low.

In general, aluminum rims are made of alloys from the 6000 and the 7000 series. These alloys are differentiated by the types of materials and amounts of materials that are added. These loadings make it possible to improve the mechanical properties of the alloy and, therefore, to reduce the thickness of the walls of the rim case.

However, the modulus of elasticity is almost constant for all of the aluminum alloys; it is on the order of 69 500 MPa (Mega Pascals) for a density on the order of 2.7. This means that all of the aluminum alloys almost have the same modulus. The amount of loading only affects the strength of the alloy. Therefore, a lighter rim made out of a top of the line alloy is stronger while keeping the same rigidity as a rim made of a standard alloy.

Furthermore, the more heavily loaded the alloy, the more difficult it is to extrude. And the extrusion speed is directly linked to the wall thickness. Under these conditions, it is easily understood that the use of more heavily loaded aluminum alloys yields good results in terms of strength but not in terms of rigidity, and leads to technical solutions that are relatively complex to implement and ultimately uneconomical.

The composite materials have the advantage of having very good mechanical properties, as well as a very good anticorrosion property. By way of comparison, the modulus of a unidirectional carbon epoxy composite varies between 100,000 and 500,000 MPa (for a 1.6 density), as a function of the specific modulus of the fibers and of the resin content. However, their drawback lies in their cost, their mediocre braking properties, particularly in the rain, and heat conduction properties, their mediocre resistance to complex biases, as is the case in a tire rim, and a mediocre resistance to impacts due to the low shear strength of composites.

There are also rims that have a metallic portion and a portion made of a composite material. These rims are normally constructed with a metallic outer band having an annular channel for the pneumatic tire and housings for fastening the spokes, as well as a thin inner ring made of a composite material. The inner ring makes it possible to reduce the weight of the metallic portion while improving the aerodynamics of the rim.

However, these rims are relatively complex to manufacture. Moreover, the contribution of the composite portion to the mechanical properties of the rim is not optimized because bidirectional fiber layers are used.

Another known rim is described in U.S. Pat. No. 6,767,070. This rim is formed by four rings connected to one another by spacers. The spokes are fastened to the spacers. Although the rim has an original structure, it is not rigid because the rings have only localized connections therebetween. There is no actual cohesion of the overall structure.

In view of the above prior art, there is a need for a rim made from a shaped element, or profile, which is easy to manufacture and has improved mechanical properties in relation to the currently available traditional rims.

SUMMARY OF THE INVENTION

To this end, the rim according to the invention includes an annular shaped element or profile.

The annular shaped element of the rim is peripherally bound by means of at least one winding of continuous fiber coated with a polymerizable resin having, on the outside, an annular channel provided for a tire, and, more particularly, a pneumatic tire.

In other words, the invention proposes manufacturing an annular profile, or shaped element, which, in a particular embodiment, is made of a known aluminum alloy that is easy to extrude, and reinforcing the mechanical properties of the shaped element with one or several bindings made by winding a resin-coated fiber therearound. The fibers have a modulus of elasticity that is markedly greater than that of the annular shaped element for a lower density. The winding or windings of resin-coated fiber contribute under these circumstances to improving the mechanical properties of the annular shaped element with a reduced weight, as well as improving both the rigidity and the strength of the rim. In the winding, the fibers are constantly tangent to the annular shaped element; their efficiency is thereby very high in view of the additional weight that they represent.

BRIEF DESCRIPTION OF THE DRAWINGS

An increased understanding of the invention can be achieved with the following description, with reference to the attached drawings, and in which:

FIGS. 2 and 3 relate to cross-sectional views of the first embodiment of the invention;

FIGS. 8a, 8b, 8c, 8d, 9a, 9b, 9c, 10a, 10b, and 10c relate to alternative embodiments;

FIG. 21 shows an alternative embodiment;

FIGS. 22a, 22b, 22c, 23a, and 23b show alternative embodiments of the invention.

DETAILED DESCRIPTION OF THE INVENTION

Figure 1A:
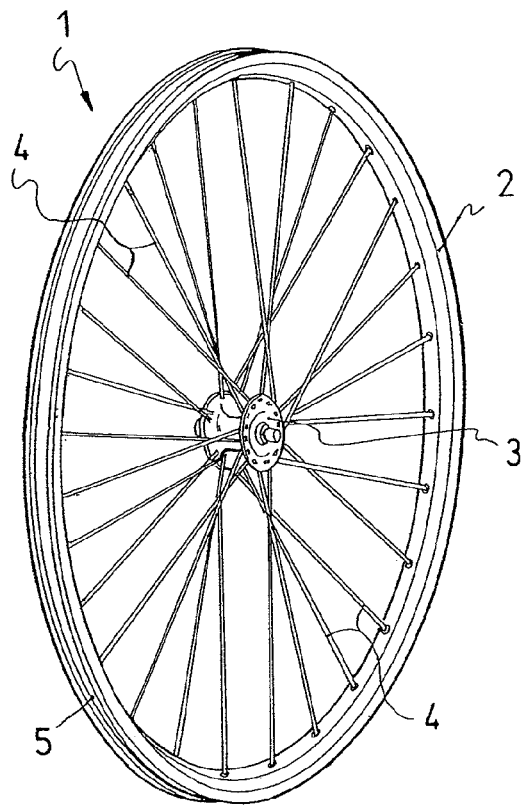
FIG. 1a is a general view of a wheel according to the prior art.
Figure 1B:
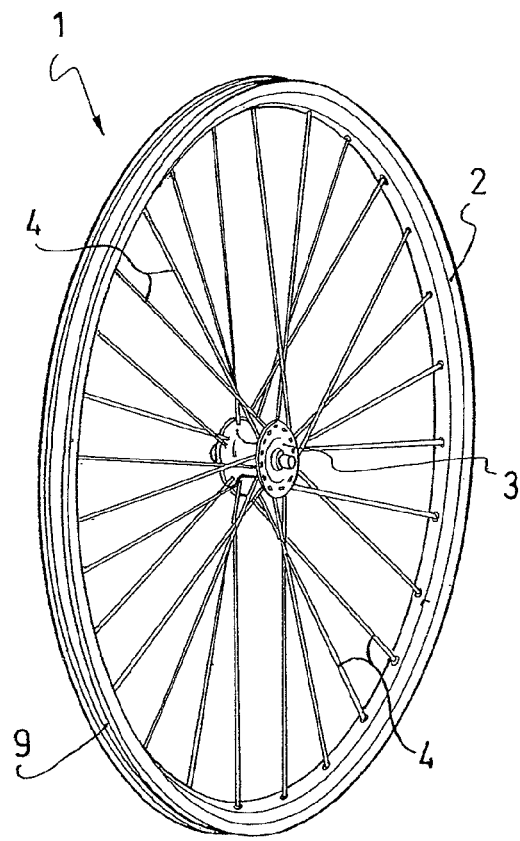
FIG. 1b is a general view of a wheel according to the invention.

The wheel 1 shown in FIG. 1a conventionally has an annular rim 2, a central hub 3 and spokes 4 connecting the rim and the hub. The rim 2 further has on its periphery an annular channel 5 that is oriented outward for receiving, as the case may be, a tubular tire or a pneumatic tire, the tire being either tubeless or having an inner tube.

For a rim such as the rim 2, the main mechanical stresses can be categorized as follows.

First, the tension of the spokes creates a high compression on the profile of the rim. For example, this compression can reach 70 MPa for a rim weighing 400 g for a road wheel and equipped with 28 spokes tensioned at 120 daN. This compression stress reduces the size of the rim by close to 2 mm out of a circumference of about 2 m, or 0.1%. To increase the rigidity in compression, and therefore to attenuate the deformation in compression of the profile, it is necessary to increase the product (E×S) of the modulus of elasticity multiplied by the cross-sectional area of the profile.

Second, there are bending stresses, frontal bending and lateral bending. Frontal bending is created by the tension of the spokes and by the radial load to which the rim is subjected due to the load which the hub withstands and to the unevenness of the road/terrain. Frontal bending generates a compression stress on the outside of the rim, as well as a traction stress on the inner portion of the rim, in the force application zone. The situation is reversed between the spokes; the outside of the rim is subject to traction stress and the inside to compression stress.

Lateral bending is created by the lateral impacts to which the rim is subjected.

In addition, there are residual stresses due to the bending of the rim during manufacture. Indeed, during the bending operation, the rollers plasticize the rim in order to provide it with its curvature. This operation stretches the outer zone of the rim and compresses the inner zone; this generates residual compression stresses in the outer zone and residual traction stresses in the inner zone of the rim.

Finally, there are stresses caused by the tire itself, such as those caused by the inflation of a tubular tire or a pneumatic tire. A tubular tire has the advantage of not stressing the rim due to its inflation. Conversely, a pneumatic tire, due to its inflation, exerts a bending stress on the flanges and a compression stress caused by the pressure of the pneumatic tire on the base of the rim.

The various stresses overlap statically and dynamically over the entire periphery of the rim.

As a result from the above, the weakest zone of a rim is often the outer zone that is subject to the overlap of all these compression stresses.

A primary idea of the invention is to reinforce the rim, particularly its outer zone, with at least one fiber binding.

FIGS. 1b and 2-4 relate to a first embodiment of the invention.

The profile of the rim shown in these figures is of the tubular tire type, with an upper bridge 9 oriented outward of the rim that is relatively slightly recessed to form a channel for receiving a conventional tubular tire. Moreover, the rim profile includes a lower bridge 10 oriented toward the hub, as well as two side walls 11 and 12. The assembly forms a casing. The upper and lower bridges 9, 10 and the side walls 11, 12 describe a casing, in the form of a "box-shaped" profile extending continuously around the annular rim. The term "box-shaped" refers to the profile having an enclosed cross-sectional space, in this case delimited by the interior surfaces of the walls 9, 10, 11, and 12. In the illustrated embodiment, the box-shape is that of a single uniform cross-sectional rim profile formed, e.g., as an extruded bar that had been bent into its annular shape.

In this and other embodiments, the outwardly extending side walls (side walls 11, 12 in FIGS. 2 and 3) are extended beyond the upper bridge 9 by flanges to form a channel for receiving the tire. The flanges have protrusions, such as lips 11*a*, 12*a*, which extend axially toward a median plane of the rim and toward the tire when received in the annular channel.

The rim shown is formed as a hoop-like structure 13 made of metallic alloy, more particularly an aluminum alloy.

The hoop 13 forms the lower bridge 10, the two side walls 11, 12 and the largest portion of the upper bridge 9 of the rim casing.

The hoop also provides the structure for fastening the spokes. Any appropriate structural arrangement known to one skilled in the art can be suitable. In particular, the two bridges can be bored in a conventional manner, and the spokes are retained by means of spoke nipples housed within the casing, possibly with additional eyelets, or the lower bridge is bored; the upper bridge is not bored, and the spokes are fastened by means of hollow screws screwed into the lower bridge, as described in the patent publication EP818328 (and family member U.S. Pat. No. 6,224,165), or any other appropriate means. The spokes could also be fastened to the side walls of the casing, as is also known to those skilled in the art.

In the area of the upper bridge 9, the shape of the hoop 13 is formed by two grooves 15, 16 that are located along the edges of the upper bridge 9, and which have respective outward oriented openings. The grooves 15, 16 define two annular spaces that are included in the overall volume defined by the casing of the rim, and which are recessed along a radial direction with respect to the pneumatic tire. For example, as can be seen in FIG. 2, the wall of the hoop that forms the upper bridge 9 is interrupted in the vicinity of the side walls 11, 12, and it is extended by two connecting walls 17, 18 that connect to the side walls 11, 12 at a distance from the top of these walls. Thus, the connecting walls 17, 18 and the upper portions of the side walls 11, 12 demarcate the two grooves.

Advantageously, the grooves 15, 16 are made during the extrusion of the metallic bar, which is then bent to form the hoop of the rim. The grooves are formed by the shape of the extrusion die. Because the grooves are open in cross-section, they do not in any way complicate the extrusion operation.

Figure 4:
FIGS. 4, 5, and 6 show various types of fibers.
Figure 5:

As shown in FIG. 3, the two grooves 15, 16 are filled with two windings 19 and 20. As explained below with reference to FIG. 7, the windings are formed by winding a continuous fiber, or fiber strand, such as glass, carbon, or aramid fiber that is embedded in a resin matrix. The fibers, or fiber strands, are formed, for example, by wicks of continuous carbon filaments. Such a wick is shown in FIG. 4. It can include between several tens and several thousands of filaments. According to another alternative embodiment shown in FIG. 5, the fiber is formed by a multitude of kinked threads or filaments, that is, elementary threads a few centimeters long that are tangled with one another in the manner of a cord.

Figure 6:
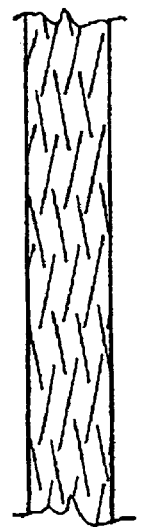

According to another alternative embodiment shown in FIG. 6, the fiber is formed by a braid in which all of the filaments are oriented along a direction close to the longitudinal direction defined by the fiber.

Other embodiments of the fiber are also suitable.

The resin is of any appropriate type, more particularly of the polyester or epoxy type. The resin can be thermosetting or thermoplastic.

The windings 19, 20 fill the volume of the grooves 15, 16 and arrangement is made so that their exposed surfaces 21, 22, i.e., visible through the opening of the grooves, are in continuity with the wall 14 of the hoop, up to the top of the side walls to form the upper bridge 9 of the rim. In this way, therefore, the upper bridge 9 is partially comprised of the resin-coated fiber. It can also be seen that the windings 19, 20 of resin-coated fiber do not extend axially outwardly beyond the side walls 11, 12.

The nesting of the windings in grooves of the annular shaped element ensures a good cohesion of these elements and a good transmission of the forces between the metallic portion and the composite portion. As shown in the embodiment of FIGS. 2 and 3, the outward opening of the grooves is narrowed by small wall edges in order to reinforce the nesting of the windings in the grooves.

Figure 7:
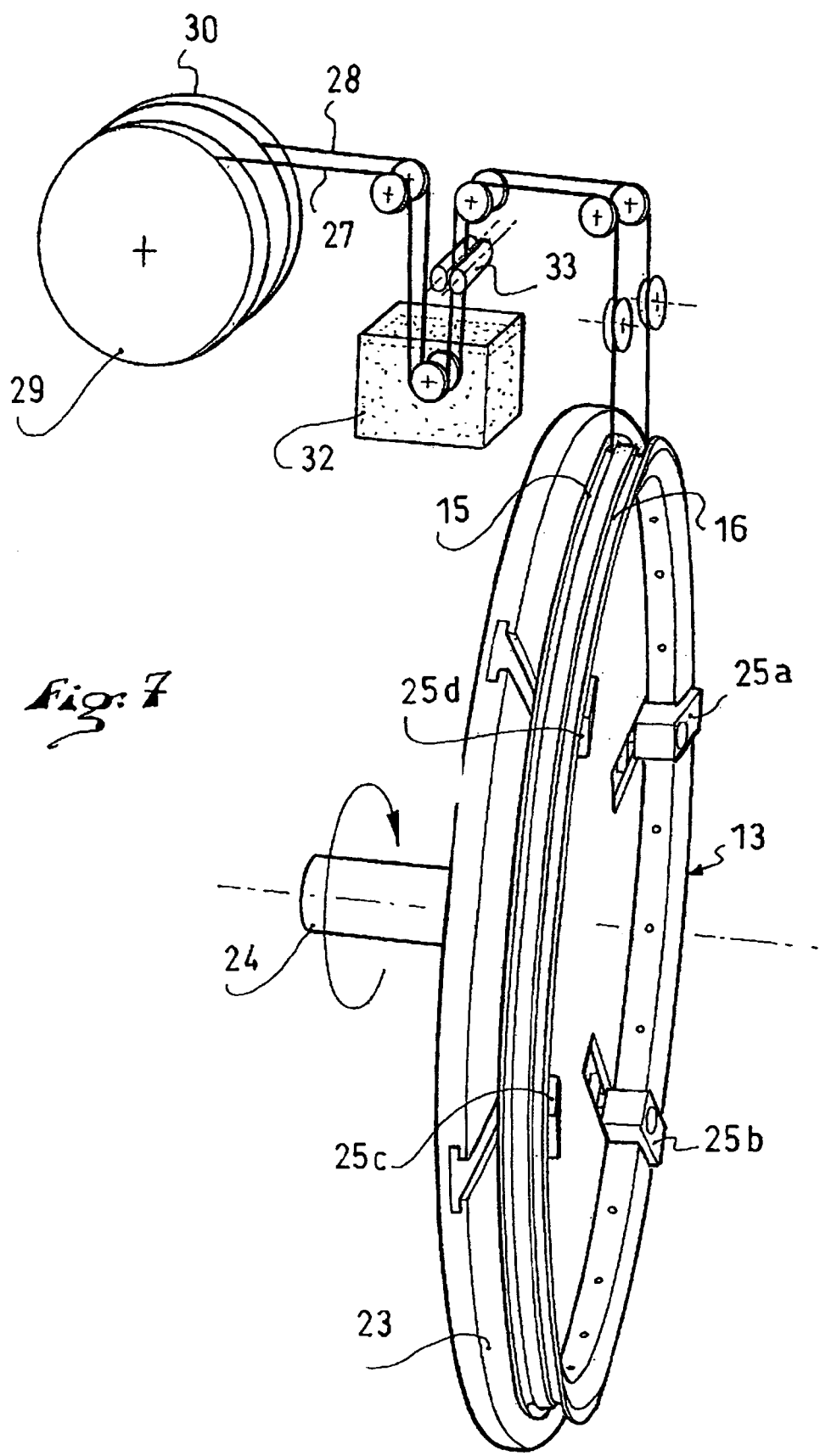
FIG. 7 illustrates a method of manufacturing the rim of FIGS. 2 and 3.

FIG. 7 schematically shows an embodiment of the windings 19 and 20.

According to this embodiment, the hoop 13 is mounted on a plate 23 that is rotationally moved by means of a shaft 24. For example, the hoop is immobilized on the plate by means of catches 25*a*, 25*b*, 25*c*, 25*d* that are movable along radial directions with respect to the axis of the shaft 24.

Two fiber strands 27 and 28 are pulled from feed rollers 29 and 30. The path of the strands is deviated, for example, by means of return rollers into an enclosure 32 filled with resin so as to impregnate them with resin. Next, the strands are guided again by return rollers so that they are presented in the plane of each of the grooves 15, 16, respectively. At the outlet of the enclosure, a drying device 33 can be provided, including, for example, two rollers pressed against one another to evacuate any possible excess of resin. In the illustrated embodiment, the fibers are tensioned so as to compact the fibers and the resin. Any appropriate means is suited to maintain this tension. The grooves are open outward here to form the windings under tension.

To form the windings 19, 20, the hoop is immobilized on the plate and the ends of the fibers are attached to the hoop by any appropriate means. For example, the ends are glued to the bottom of the grooves by means of an adhesive, or the ends are inserted in a hole or slit provided for this purpose on the hoop; other means can alternatively be used. Once the ends of the fiber strands are fastened to the hoop, the plate is rotationally driven to make the windings 19 and 20. Once the windings are completed on the hoop, the fibers are cut and the ends are fixed by any appropriate means, such as an adhesive, for example.

To facilitate the filling of the grooves, the return rollers which distribute the fibers at the end can be actuated with a small alternating axial movement in order that the windings tend to position themselves next to one another, and not on top of one another.

Next, the resin is polymerized. Depending upon the type of resin used, the polymerization is carried out at ambient temperature, or it is accelerated by an external heating. The heat can be provided by any appropriate means; for example, the hoop of the rim can be heated before the winding operation, or infrared heating ramps can be used, or yet curing can be undertaken in an oven. In a particular embodiment, during resin polymerization, the rim is kept in a rotational movement in order to prevent a local concentration of resin caused by gravity.

Once the resin has been polymerized, the invention includes the option of a finishing operation in the area of the surfaces 21 and 22 which form a portion of the upper bridge. For example, a superficial machining can be undertaken; such a machining can deteriorate certain superficial windings, but it does not affect the general structure of the winding. A superficial coating of resin or of any other appropriate material can be used to even up the possible unevenness of the surfaces 21 and 22.

One can also vary the distribution of the fibers, particularly by controlling the axial displacement of the return rollers that distribute the fibers at the end in order to reduce the formation of any unevenness.

The windings are formed of about 60% of fibers and 40% of resin in volume, depending upon the compaction. Furthermore, a winding includes at least one fiber winding with an added lapping portion. In a particular embodiment, it includes at least two windings to ensure the continuity of the binding and to prevent a local unbalance. The number of windings is dependent upon the type and size of the fiber. For the embodiment shown, with a wick having 12,000 filaments, there are about ten windings. All these values are provided by way of example.

Numerous alternative embodiments are possible. Instead of fibers coated with resin under wet conditions, one could use fibers including a mixture of dry fibers and fibers made of a thermoplastic material, which is heated upon exit from the feed roller, or yet fibers impregnated with polymerized resin, the polymerization reaction of which is blocked by maintaining low temperature.

Instead of driving the hoop rotationally, one could keep it immobile and have a rotating distribution of the fibers that form the windings.

The two windings could also be made separately, or could be made from feed rollers and systems located on each side of the hoop.

The windings could also be made in several portions, and two or more fibers could be simultaneously or successively wound in the same winding, for example. However, in a particular embodiment, it is important to preserve the continuity of the fiber over the entire winding.

According to the alternative embodiment shown in FIGS. 8a-8d, the grooves of the hoop 213, and in particular the groove 215 shown, is demarcated on one side by the side wall 211 of the annular profile and on the other side by the wall 217 and an extension 217a of the coupling wall 217 that rises beyond the bridge 209 up to the height of the side wall 211. In other words, the cross section of the groove 215 is U-shaped, with its side walls having the same depth.

The volume of the groove 215 is filled with the windings 219 of a resin-coated fiber to up to the top of its side walls.

After polymerization of the resin, the extension 217a and the upper portion of the windings 219 is machined, for example, by means of a turning cutting tool 220 to form an upper surface 221 in continuity with the upper surface of the bridge 209. Thereby, like the embodiment shown in FIG. 3, the windings 219 of resin-coated fiber do not extend radially outwardly beyond the side wall 211.

According to the alternative embodiment shown in FIGS. 9a-9c, the shape of the annular hoop 313 is the same as that shown in FIG. 2.

The groove 315 is filled with a binding made of two portions. The first portion 319a is formed by the windings of a resin-coated fiber. This first portion fills the volume of the groove up to the top of the intermediate wall 317, at its junction with the upper bridge 309.

A second portion 319b is then attached to fill up the remaining volume of the groove and to ensure the continuity of the upper bridge between the top of the intermediate wall 317 and the top of the side wall 313.

This portion 319b is made, for example, of resin or of a thermoforming plastic material in the manner of a rim base, or of any other appropriate material.

Figure 10A:
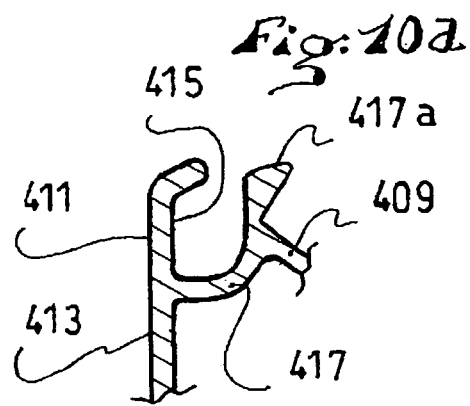
Figure 10B:
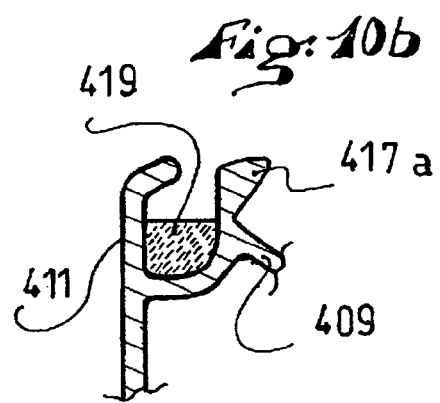
Figure 10C:
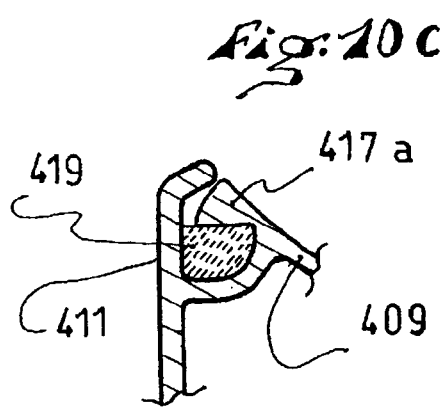

According to the alternative embodiment shown in FIGS. 10a-10c, the intermediate wall 417 has an extension 417a that extends parallel to the side wall 411 of the hoop 413. The groove 315 thus formed is partially filled by the winding 419 as shown in FIG. 10b; then the extension 417a is bent back above the winding in order to close the opening of the groove 415 and to ensure the continuity of the upper bridge 409 up to the top of the side wall 411.

The main advantage of these various alternative embodiments is to reconcile at best the filling of the grooves with the windings, and the presence, in the area of the opening of the grooves, of a surface that is inclined in relation to the axial direction of the hoop to form the wall for supporting the tubular tire.

The fiber windings thus made form bindings that reinforce both the rigidity and the strength of the rim along the two frontal and lateral directions due to the fact that the bindings have a modulus of elasticity that is markedly greater than that of the aluminum alloy, that the windings are nested in grooves of the hoop, and that they form with it a structure that is composite but completely coherent or integrated by adhesion.

High strength and rigidity characteristics can therefore be obtained by means of a hoop made of a standard alloy, which is reinforced by such bindings made, for example, of carbon fibers. Since carbon has a modulus and a strength that are greater than those of aluminum, as well as a lower density, one can easily manufacture a rim that is more rigid and stronger than a rim that would be made entirely out of a metallic alloy of the same quality, or of a higher quality. Correlatively, one can construct a lighter rim having mechanical properties that are equivalent to or greater than those of a conventional rim made of alloy, or by reducing the aluminum mass, or by reducing the number of spokes.

Since the alloy of the hoop is a standard alloy, a profile with thinner walls can be extruded at high speed. Therefore, the result is economically positive.

Calculation has determined the properties of a rim having the profile shown in FIG. 3.

|  | Reference rim 100% aluminum | Rim according to the invention | | |
|---|---|---|---|---|
|  |  | aluminum | carbon/ epoxy composite | total |
| Mass (grams) | 371 | 313 | 56.6 | 369.6 |
| Relative density d | 2.7 | 2.7 | 1.5 | 2.41 |
| Modulus E (MPa) | 69500 | 69500 | 105000 |  |
| Strength (MPa) | 290 | 290 | 1000 |  |
| E/d | 25740 | 25740 | 70000 |  |
| Elongation % | 0.42 | 0.42 | 0.95 |  |
| E × S (106 N) | 4.62 | 4.18 | 2.01 | 6.19 |
| Lateral Ei (N · m$^2$) | 209.9 | 236 | 121.9 | 657.9 |
| Frontal Ei (N · m$^2$) | 236.6 | 188.4 | 1.8 | 261.9 |
| Lateral Mf (N · m) | 103.9 | 98.5 |  | 149.3 |
| Frontal Mf (N · m) | 76.4 | 68.7 |  | 79.2 |

For the above table, the modulus is characteristic of the rigidity of the material.

The strength is the elastic strength of the material.

E/d designates the specific modulus of the material, that is, the modulus relative to the density.

The elongation is the maximum elastic elongation prior to irreversible deformation.

E×S designates the product of the modulus E multiplied by the cross-sectional surface of the profile; it is characteristic of the rigidity in compression of the profile.

Lateral Ei designates the rigidity in lateral bending of the profile.

Frontal Ei designates the rigidity in frontal bending of the profile.

Lateral Mf designates the strength in lateral bending of the profile.

Frontal Mf designates the strength in frontal bending of the profile.

The above table shows that the mechanical properties of the rim are generally improved with respect to a conventional rim having an equivalent weight. In particular, it can be noted that the product E×S goes from 4.62 to 6.19, i.e., a 34% increase for the compression strength. This product could be further improved by using carbon fibers of higher modulus which could increase the modulus of elasticity of the composite from 105,000 to 300,000 MPa.

The lateral rigidity of the rim is increased by close to 70%, and the frontal rigidity by close to 10% with respect to the profile of the bare rim. Indeed, the spokes also play a role in the lateral and frontal rigidity of the wheel.

Significant increases of the frontal and lateral strength can also be noted.

However, important to the invention is the increase in the rigidity of the profile, which could not be obtained up until now with a more or less loaded alloy.

The particular number and position of the bindings are not limiting. However, in a particular embodiment, the bindings are positioned in the upper portion of the rim, that is, the farthermost portion from the center of gravity of the profile cross section. Indeed, it is known, according to the Huyghens' theorem, that the quadratic moment of a surface with respect to a point varies with the square of the distance with respect to that point. It is therefore in this zone that the efficiency of the bindings is the most significant. Furthermore, it is also in this zone that the stresses on the rim are the highest.

Figure 11:
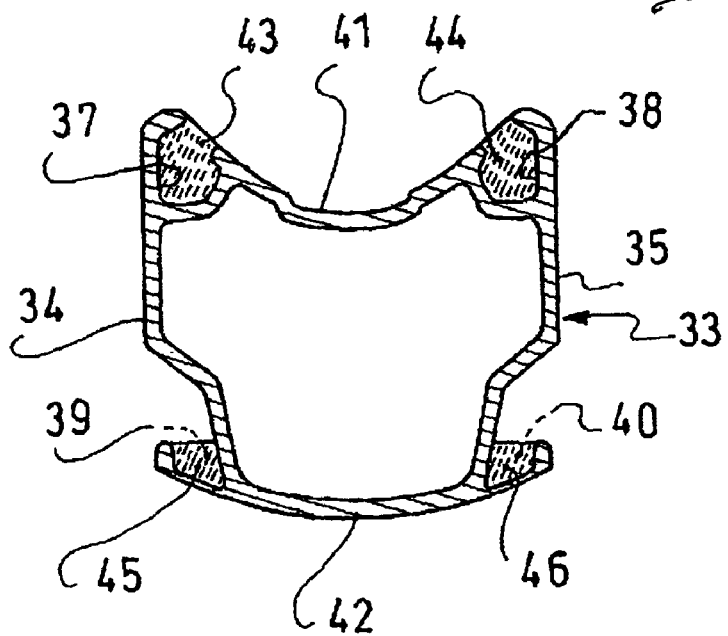
FIG. 11 relates to another embodiment of the invention.

FIG. 11 relates to an alternative embodiment of the invention. The rim comprises a hoop 33 that is provided with four grooves 37, 38, 39, 40 open radially outward and arranged, with respect to the orientation of the cross section shown in FIG. 11, for example, on top of four parts of the profile cross section. The two upper grooves 37, 38 are on the edges of the upper bridge 41, at their junctions with the side walls 34, 35, and the two grooves 39, 40 in extension on each side of the lower bridge 42, in the area of two reinforcements that the rim profile has in this zone.

Each groove houses a winding 43, 44, 45, 46 of resin-coated fiber, particularly of carbon fiber. Each winding fills up the volume of the groove, particularly the upper windings 43, 44, in order to provide an outer surface in continuity with that of the hoop in the area of the upper bridge. The windings form bindings that encircle the metallic hoop and thereby reinforce the structure of the rim.

Figure 12:
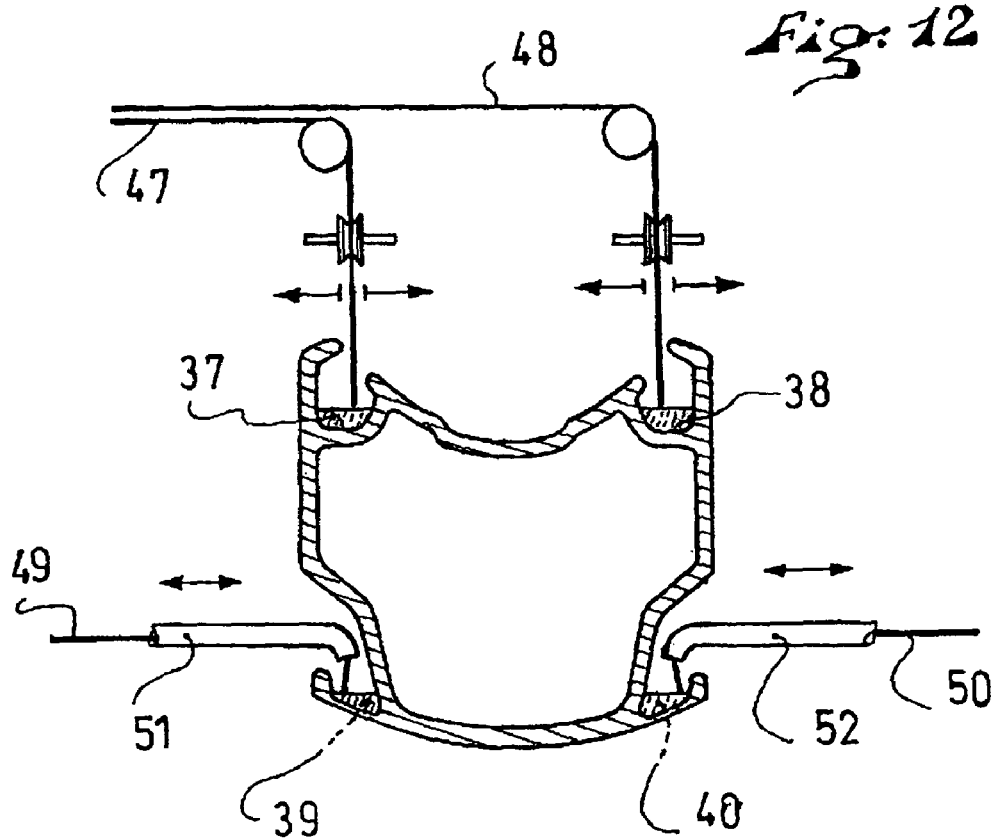
FIG. 12 schematically illustrates a process of manufacturing the rim of FIG. 11.

FIG. 12 depicts a method of manufacturing the rim of FIG. 11. As shown in FIG. 12, the two windings that are formed in the upper grooves 37, 38 are each made from a fiber strand 47, 48 guided by return rollers. For the windings of the grooves 39, 40, the fiber strands 49, 50 are guided by nozzles 51, 52, the ends of which are engaged in the recesses of the profile so as to be in the radial plane of the respective grooves.

As depicted in FIG. 12 by the double arrows, the return rollers and the nozzles can be actuated with an alternating movement to ensure a uniform filling of the grooves with the fibers of the windings.

The four windings here can be made simultaneously, or in pairs, or individually, or by rotationally driving the hoop of the rim, or yet by rotating the feed means made of fibers around the hoop of the rim.

Compared to the previous embodiment, the two additional windings further improve the mechanical properties of the rim. Indeed, the bindings are located as far away from the center of gravity of the cross section as possible; as a result, their quadratic moment with respect to the center of gravity is optimum.

Figure 13:
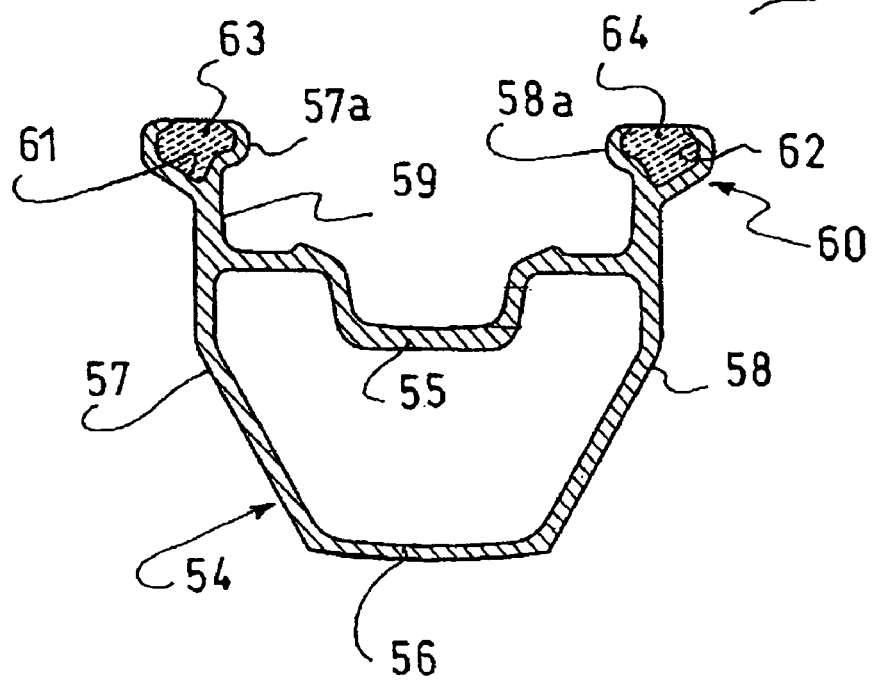
FIGS. 13-19 are related to alternative embodiments of the rims.

FIG. 13 and the succeeding drawing figures show rim shaped elements that can be used with conventional tube or tubeless tires.

Generally speaking, a profile, such as the profile 54 shown in FIG. 13, includes a casing formed by an upper bridge 55 oriented outward, a lower bridge 56 oriented toward the hub, and two side walls 57, 58. The two side walls are extended beyond the upper bridge by flanges to form with it a channel 59 for receiving the tire. At the upper ends of the side walls 57, 58 are protrusions 57a, 58a, i.e., bulges or lips, which are oriented inward of the channel, i.e., toward the median plane of the rim, and which contribute to maintaining the sides of the tire in place.

The drawing shows an upper bridge with a profile that is consistent with, or is generally similar to, that which is disclosed in the patent document EP0893280 (and family member U.S. Pat. No. 6,257,676). Although such a profile can be used in the present invention, any other appropriate profile can be used instead.

According to the embodiment shown, the profile of the rim includes a metallic hoop 60 with two grooves 61, 62 located at the top of the flanges and open radially outward of the rim. Advantageously, a portion of the wall of the grooves forms the previously described lips/bulges.

The two grooves are filled with windings 63, 64 of resin-coated fiber. The fiber can be of any appropriate type, such as carbon or aramid fiber, for example, and the resin can be of the thermoplastic or thermosetting type. The windings can be made with a continuous fiber, or they can be made in several pieces. The windings form bindings that reinforce the structure of the rim.

Furthermore, the windings reinforce the structure in the area of the upper ends of the flanges, which are zones that are particularly subject to forces/biases. The increase in the volume of the upper ends of the flanges also reduces the risks of pinch flats.

Figure 14:
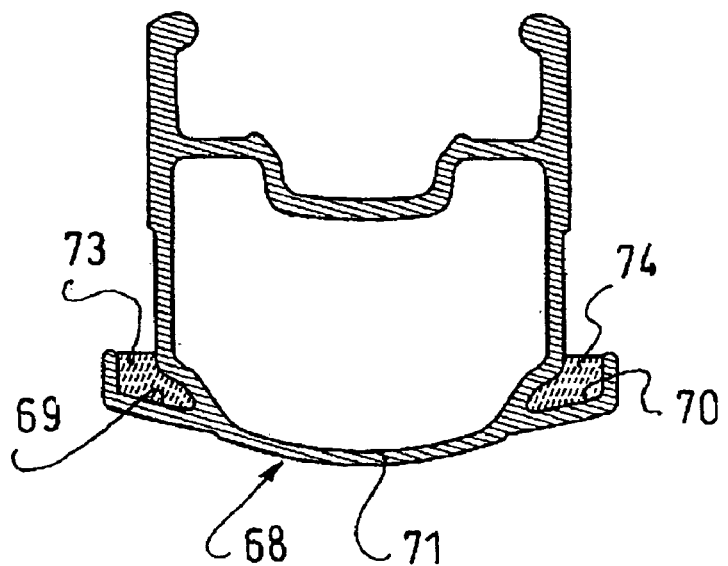

According to the embodiment of FIG. 14, the lower bridge 71 of the hoop 68 is laterally extended by two channels 69, 70 that form two grooves. The windings 73, 74 are wound in the grooves to form two bindings in the area of the lower bridge of the rim.

Figure 15:
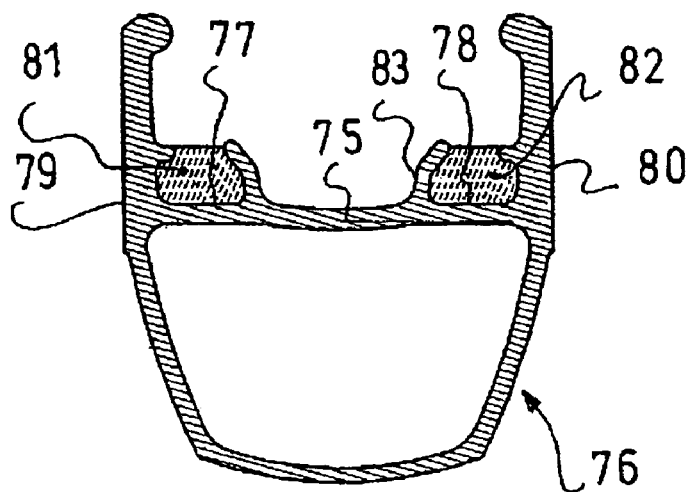

According to the construction shown in FIG. 15, it is the upper bridge 75 of the hoop 76 that has two grooves 77, 78 along the side walls 79, 80. The openings of the two grooves are oriented outward of the rim and they receive the two fiber windings 81, 82.

Advantageously, the two grooves in this case demarcate a central well or groove 83 that is useful for mounting the tire. Furthermore, once the tire is mounted, the two windings are no longer visible. With such a profile, one can easily apply the windings. Moreover, the braking surfaces of the side walls and the outer shape of the profile are not affected by the presence of the grooves.

Figure 16:
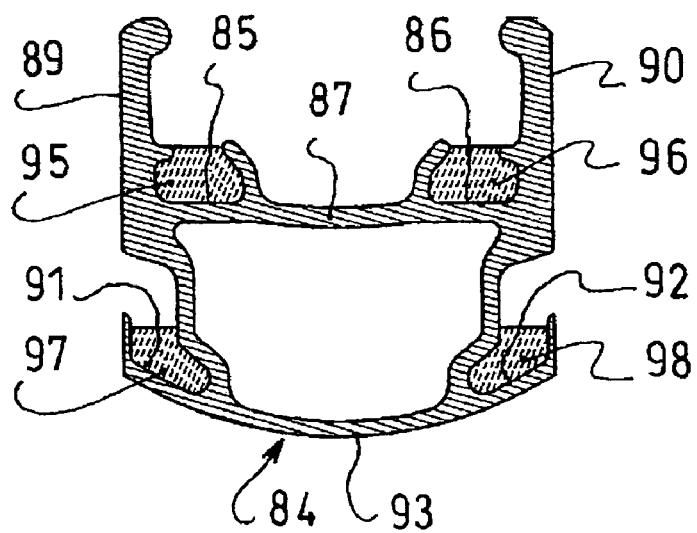

FIG. 16 relates to an alternative construction. The metallic hoop 84 has four grooves, two grooves 85, 86 in the area of the upper bridge 87 along the side walls 89, 90, and two grooves 91, 92 formed by channel-shaped extensions of the lower bridge 93. Each of the grooves houses a resin-embedded fiber winding 95, 96, 97, and 98, respectively.

Figure 17:
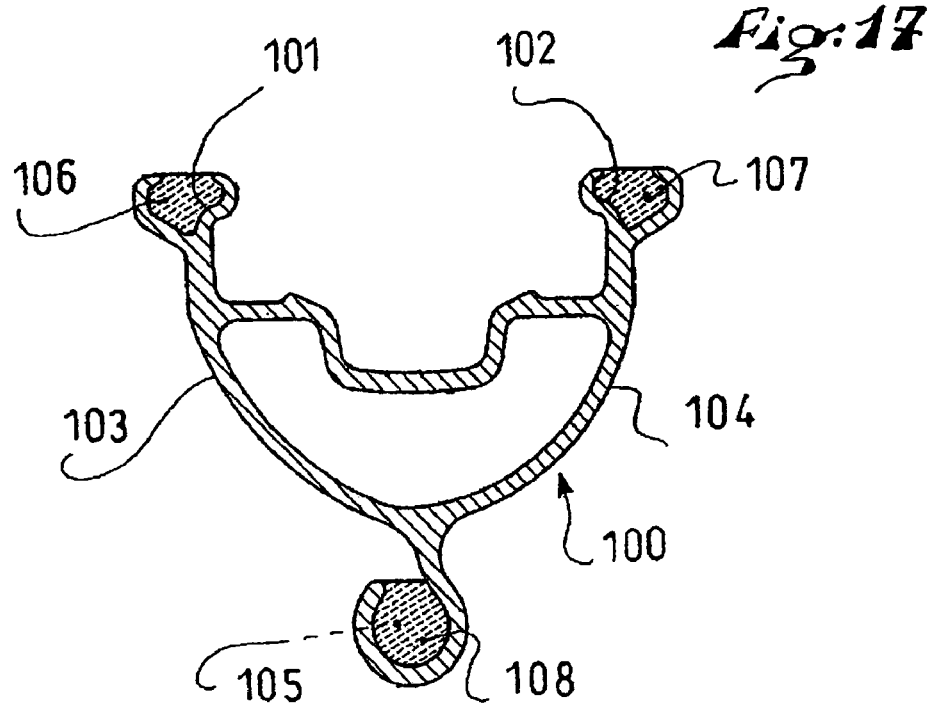

According to the construction shown in FIG. 17, the metallic hoop 100 of the rim has three grooves, namely, two grooves 101, 102 located on the top of the side walls/flanges 103, 104, and one groove 105 located in the lower portion of the hoop profile (that is, the lower portion with respect to the cross section shown in FIG. 17) by an extension formed somewhat like an upside-down question so as to include an opening facing outward of the hoop. A respective winding 106, 107, 108, is housed in each of the grooves, respectively, in order to form three bindings for reinforcing the hoop.

Figure 18:
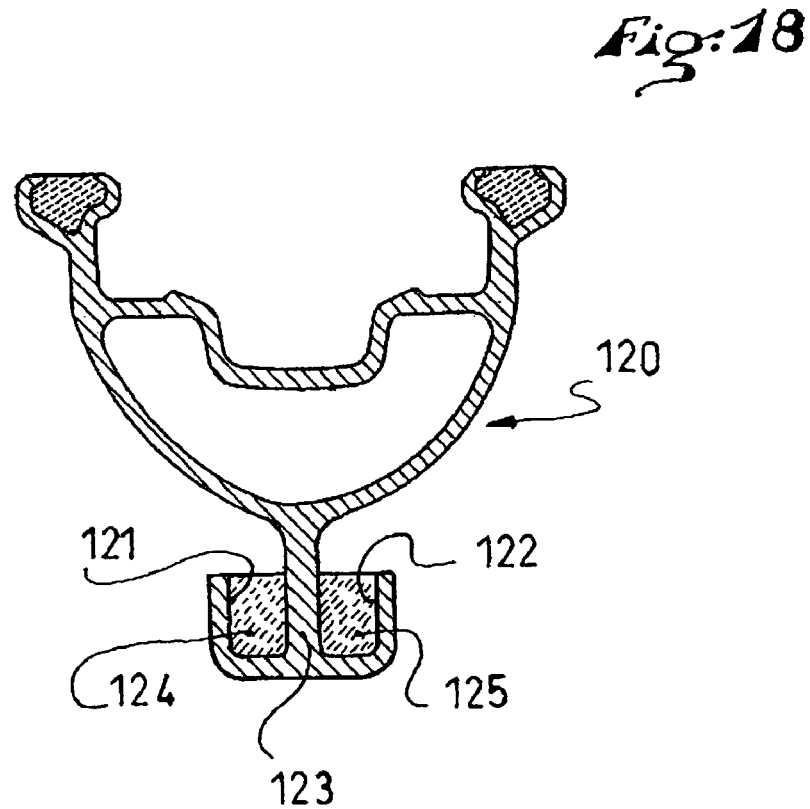

In an alternative embodiment, FIG. 18 shows a metallic hoop 120 with a double groove 121/122 located in the lower portion of the profile, on each side of a median rib 123 located in the median plane of the rim and oriented toward the center of the rim. The double groove receives two fiber windings 124, 125.

Figure 19:
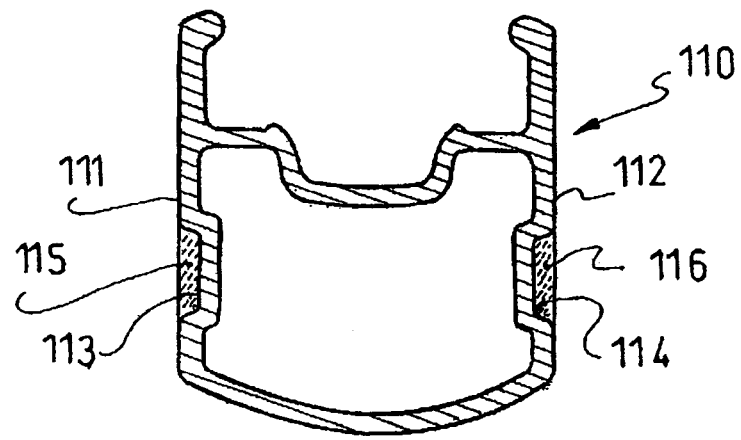
Figure 20:
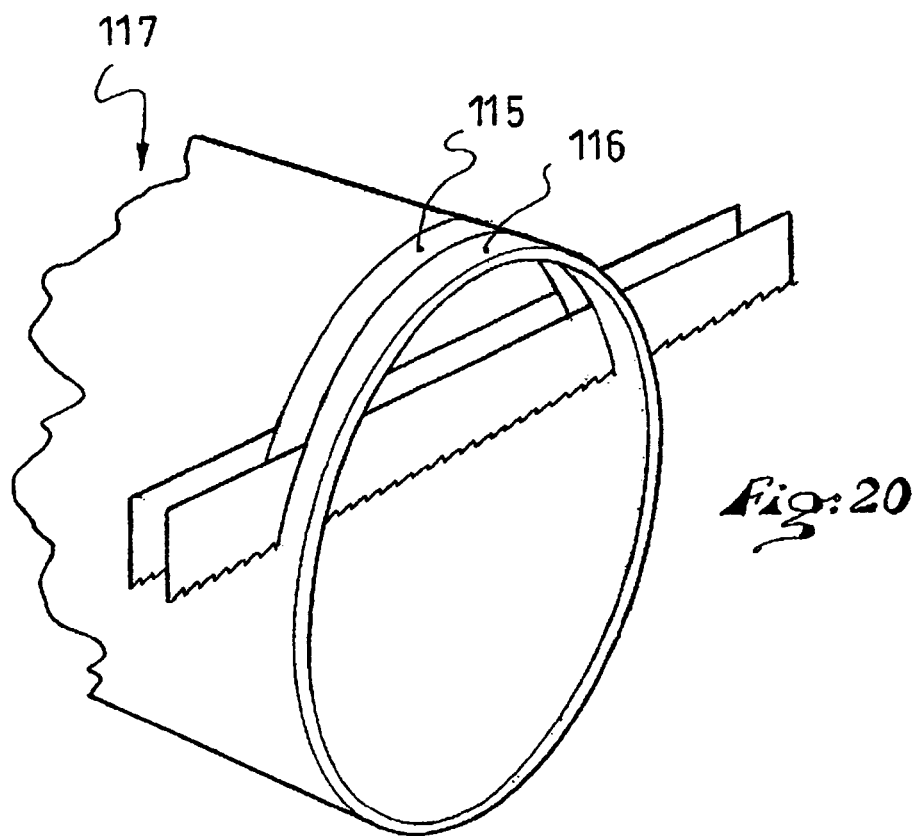
FIG. 20 schematically shows the manufacture of the rim of FIG. 12.

FIGS. 19 and 20 relate to an alternative embodiment of the invention.

Rather than being wound on the metallic hoop, the windings are prepared in advance and then positioned in housings of the hoop.

Thus, FIG. 19 shows a hoop 110, each of the side walls 111, 112 of which has a reinforcement 113, 114 that opens outwardly, not radially outward of the rim but outward from a median plane of the rim toward each of its sides. The reinforcements form grooves in which windings 115, 116 are housed. For example, as is schematically shown in FIG. 20, the windings are made by the slicing of a tube 117. The slices have dimensions that correspond to the dimensions of the two grooves. For example, the tube is made from one or several carbon fibers or any other appropriate material that is wound on a mandrel.

Once cut, the slices are housed in the grooves, where they are assembled by any appropriate means, such as glue or resin, for example. It is contemplated, according to the invention, that the side walls can possibly then be trimmed, or finished, by machining.

Instead of one slice, each of the bindings could be formed by a plurality of slices nested in one another, the outer diameter of one slice being substantially equal to the inner diameter of the next slice.

The slices form bindings that reinforce the structure of the rim.

FIG. 21 shows an alternative embodiment of the windings 115, 116. This alternative embodiment implements a mandrel 125 formed by a plurality of shouldered elements 126, 127, 128, 129. Each element has a central core 126a, 127a, 128a, 129a around which the winding is formed, as well as a disk 126b, 127b, 128b, 129b that demarcates the groove in which a winding is formed by taking support on the disk and the disk of the adjacent element.

The windings are formed either simultaneously or continuously after one another. In the latter case, when a groove is full of fibers, the fiber is caused to skip the disk in order to bring it to the next groove. When the windings are made, the elements of the mandrel as disassembled, and the windings are taken out of their respective elements in order to be positioned in the grooves of the metallic hoop.

The number of elements for a mandrel, as shown in FIG. 21, is not considered limited by the illustrated embodiment.

FIGS. 22a-22c, 23a, and 23b illustrates cases in which the profile of the metallic hoop does not have any groove for receiving a fiber winding.

According to FIG. 22a, the hoop 135 has a profile that is provided for a tubular tire rim. Therefore, it has the same general form as the profile of FIGS. 2 and 3, except for the absence of grooves.

A fiber 136 is wound on the bridge 137, taking advantage of its concave shape. For example, the fiber is in the form of a wick or the form of a braid, and it is wound from the bottom of the upper bridge toward each of the side walls.

At the end, as shown in FIG. 22c, the fiber forms a continuous winding 138 that lines the wall of the upper bridge. This winding forms a binding that reinforces the structure of the metallic hoop.

Figure 23A:
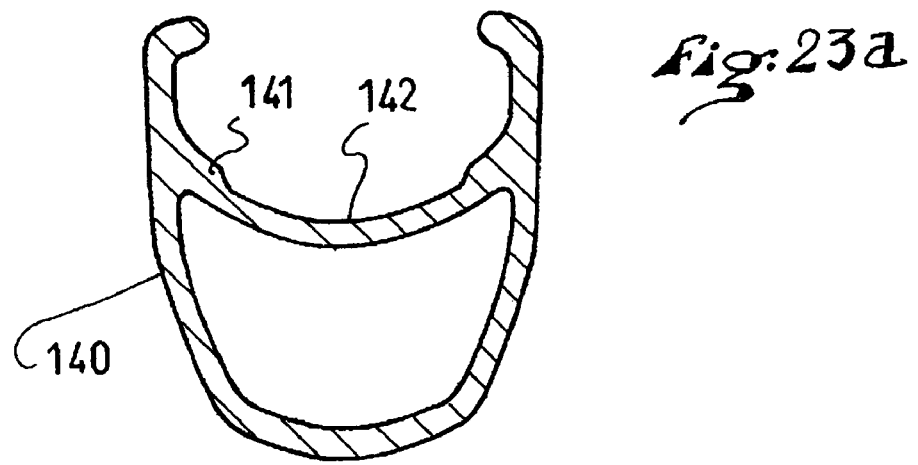
Figure 23B:
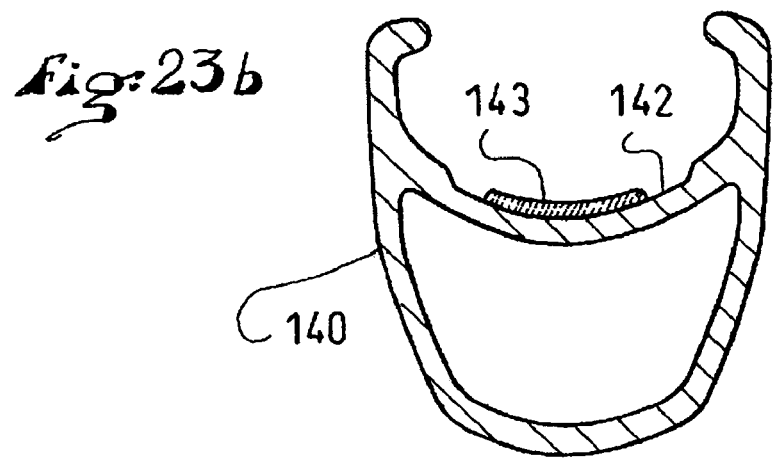

According to FIG. 23a, the cross section of the metallic hoop 140 has a known shape provided for a tire rim, with, in particular, an upper bridge 141 having a median groove 142 provided for receiving the tire. In this case, the winding 143 is made at the bottom of the groove 142 to form the reinforcing binding.

For these two cases, the position of the bindings is not optimal; they are indeed relatively close to the center of gravity of the cross section. However, their contribution to improving the mechanical properties of the rim is significant, particularly in compression. Furthermore, they have the advantage of implementing conventional forms of a metallic shaped element. However, it is advantageous to accentuate the concavity of the upper bridge for the profile 135 and the depth of the groove for the profile 140.

The present description is only provided by way of example, and other embodiments of the invention can be adopted without leaving the scope thereof.

For example, the invention is not limited to the field of wheels having tension spokes; it also applies to wheels having compression spokes, and even to solid wheels that include a peripheral hoop made of metallic alloy. The invention can also apply to molded rims or wheels; the grooves could then be made during the molding operation, or subsequent thereto by machining.

Fibers other than carbon fibers, such as, for example, glass fibers, PBO-aramid fibers, PIPD fibers or the like could also be used, provided that their specific modulus (that is, their modulus to density ratio) is greater than that of the hoop of the rim so that such fibers can improve the mechanical properties of the rim.

The invention claimed is:

1. A rim for a cycle wheel comprising:
   an annular shaped element having an outer annular channel, said annular shaped element having a structure and shape to receive and to have mounted on said outer annular channel a pneumatic tire;
   said annular shaped element concurrently comprising:
      a box-shaped rim profile extending continuously along an entirety of the annular shaped element;
      at least one groove having an opening oriented radially or axially outward of the annular shaped element;
      at least one lip extending axially toward a median plane of the rim and engaging the pneumatic tire when received in said outer annular channel;
   at least one winding encircling said annular shaped element, said winding comprising a continuous fiber coated with a polymerizable resin;
   said fiber having a modulus of elasticity greater than a modulus of elasticity of the annular shaped element;
   said winding being housed and exposed in one of said at least one groove of said annular shaped element.

2. A rim according to claim 1, wherein:
said box-shape comprises:
  a lower bridge;
  an upper bridge oriented radially outward of the lower bridge;
  two side walls;
the annular shaped element comprises two grooves adjacent opposite edges of the upper bridge, each of said grooves housing a respective one of said at least one winding of resin-coated fiber.

3. A rim according to claim 1, wherein:
said box-shape comprises:
  a lower bridge;
  an upper bridge oriented radially outward of the lower bridge;
  two side walls;
the annular shaped element comprises two grooves adjacent opposite edges of the lower bridge, each of said grooves housing a respective one of said at least one winding of resin-coated fiber.

4. A rim according to claim 3, wherein:
said two grooves are formed by a channel-shaped profile that are extensions of said lower bridge.

5. A rim according to claim 4, wherein:
said two grooves are located in an area of two recesses of the rim profile.

6. A rim according to claim 1, wherein:
said box-shape comprises:
  a lower bridge;
  an upper bridge oriented radially outward of the lower bridge;
  two side walls that extend radially beyond the upper bridge to form a channel for receiving the tire;
the annular shaped element comprises two grooves located at the top of the side walls, each of said grooves housing a respective winding of said at least one winding of resin-coated fiber.

7. A rim according to claim 6, wherein:
a portion of each of said walls forming the grooves forms a lip for gripping a tire to be mounted on the rim.

8. A rim according to claim 1, wherein:
said box-shape comprises:
  a lower bridge;
  an upper bridge oriented radially outward of the lower bridge;
  two side walls;
the annular shaped element comprises a lower portion having an upside-down question mark shaped extension of said lower portion, said extension including a groove presenting a radially outward oriented opening;
at least one winding of said resin-coated fiber is housed in said groove of said extension.

9. A rim according to claim 1, wherein:
said box-shape comprises:
  a lower bridge;
  an upper bridge oriented radially outward of the lower bridge;
  two side walls, each of said side walls has a recess that opens laterally outward with respect to a median plane of the rim, each of said recesses housing a respective winding of said resin-coated fiber.

10. A rim according to claim 1, comprising:
a concave upper bridge, said winding of resin-coated fiber being formed on the concave portion of the upper bridge.

11. A rim according to claim 1, comprising:
an upper bridge having median groove, said winding of resin-coated fiber being formed at a bottom of said median groove.

12. A bicycle wheel comprising:
a rim;
a hub;
spokes connecting said rim and said hub;
said rim comprising:
  an annular shaped element having an outer annular channel, said annular shaped element having a structure and shape to receive and to have mounted on said outer annular channel a pneumatic tire;
  said annular shaped element concurrently comprising:
    a box-shaped rim profile extending continuously along an entirety of the annular shaped element;
    at least one groove having an opening oriented radially or axially outward of the annular shaped element;
    at least one lip extending axially toward a median plane of the rim and engaging the pneumatic tire when received in said outer annular channel;
  at least one winding encircling said annular shaped element, said winding comprising a continuous fiber coated with a polymerizable resin;
  said fiber having a modulus of elasticity greater than a modulus of elasticity of the annular shaped element;
  said winding being housed and exposed in one of said at least one groove of said annular shaped element.

13. A method of manufacturing a rim for a cycle wheel, the rim including an annular shaped element having an outer annular channel adapted to receive a pneumatic tire, said outer annular channel having at least one groove oriented radially or axially outward of the annular shaped element, said method comprising:
forming the annular shaped element to define the annular channel, at least in part, by at least one lip extending axially toward a median plane of the annular shaped element and engaging the pneumatic tire when received in the annular channel, and to define a box-shaped rim profile extending continuously along an entirety of the annular shaped element;
after said forming, winding around the annular shaped element, within said groove, a plurality of windings of a fiber strand coated with polymerizable resin encircling the annular shaped element, said plurality of windings of a fiber strand forming a binding around the annular shaped element, said fiber strand having a first end and a second end.

14. A method according to claim 13, wherein said groove is an annular groove, said method further comprising:
manufacturing the annular shaped element to have said annular groove, with said annular groove having a radially outward oriented opening;
wherein said winding around the annular shaped element comprises winding the resin-coated fiber around the annular shaped element within said annular groove.

15. A method according to claim 13, wherein:
manufacturing the annular shaped element to have a plurality of annular grooves, each of said grooves having a radially outward oriented opening;
said winding resin-coated fiber around the annular shaped element comprises simultaneously winding a resin-coated fiber around the annular shaped element within each of said plurality of annular grooves.

16. A method according to claim 13, wherein:
windings of resin-coated fiber are first made and said windings are secondly placed in recesses of the annular shaped element.

17. A rim according to claim 1, wherein:
said box-shape comprises:
a lower bridge
an upper bridge oriented radially outward of the lower bridge;
two side walls extending radially outward from the lower bridge to the upper bridge;
said at least one lip comprising two lips on opposite sides of the median plane, each of said two lips extending from a respective one of said two side walls and toward the median plane.

18. A bicycle wheel according to claim 12, wherein:
said box-shape comprises:
a lower bridge
an upper bridge oriented radially outward of the lower bridge;
two side walls extending radially outward from the lower bridge to the upper bridge;
said at least one lip comprising two lips on opposite sides of the median plane, each of said two lips extending from a respective one of said two side walls and toward the median plane.

19. A method of manufacturing a rim for a cycle wheel, the rim including an annular shaped element, said method comprising:
forming the annular shaped element by extruding a bar to form a box-shaped profile and bending said extruded bar into an annular shape;
after said forming, winding around the annular shaped element a plurality of windings of a fiber strand coated with polymerizable resin, forming a binding around the annular shaped element, said fiber strand having a first end and a second end;
said fiber of said fiber strand having a modulus of elasticity greater than a modulus of elasticity of the annular shaped element.

20. A method according to claim 19, wherein:
said forming comprises forming the annular shaped element to have an annular groove having a radially or axially outward oriented opening;
said winding around the annular shaped element comprises winding the resin-coated fiber around the annular shaped element within said annular groove.

21. A method according to claim 19, wherein:
said forming comprises forming the annular shaped element to have a plurality of annular grooves, each of said grooves having a radially or axially outward oriented opening;
said winding resin-coated fiber around the annular shaped element comprises simultaneously winding a resin-coated fiber around the annular shaped element within each of said plurality of annular grooves.

22. A method according to claim 19, wherein:
windings of resin-coated fiber are first made and said windings are secondly placed in recesses of the annular shaped element.

23. A rim for a cycle wheel comprising:
an annular extruded element having an outer annular channel adapted to receive a pneumatic tire;
said annular extruded element having a box-shaped profile extending continuously along an entirety of the annular extruded element;
a plurality of windings of a fiber strand encircling the annular extruded element, said fiber of said fiber strand comprising a continuous fiber coated with a polymerizable resin;
said fiber strand having a first end and a second end.

24. A rim according to claim 23, wherein:
said annular extruded element comprises at least one groove;
a respective winding of said at least winding is housed in one or more of said at least one groove of the annular extruded element.

25. A rim according to claim 24, wherein:
each groove of said one or more of said at least one groove has an opening oriented radially or axially outward of the annular extruded element.

26. A rim according to claim 23, wherein:
said box-shape comprises:
a lower bridge;
an upper bridge oriented radially outward of the lower bridge;
two side walls;
the annular extruded element comprises two grooves adjacent opposite edges of the upper bridge, each of said grooves housing a respective one of said at least one winding of resin-coated fiber.

27. A rim according to claim 1, wherein:
said box-shaped rim profile comprises a single uniform cross-sectional rim profile extending continuously along an entirety of the annular shaped element.

28. A bicycle wheel according to claim 12, wherein:
said box-shaped rim profile comprises a single uniform cross-sectional rim profile extending continuously along an entirety of the annular shaped element.

29. A method according to claim 13, wherein:
said forming the annular shaped element comprises forming the annular shaped element to have a single uniform cross-sectional rim profile extending continuously along an entirety of the annular shaped element.

30. A method according to claim 19, wherein:
said forming the annular shaped element by extruding comprises forming a single uniform cross-sectional rim profile extending continuously along an entirety of the annular shaped element.

31. A rim according to claim 23, wherein:
said box-shaped profile comprises a single uniform cross-sectional rim profile extending continuously along an entirety of the annular extruded element.

32. A rim according to claim 1, wherein:
said annular shaped element is an extruded element comprising said box-shaped rim profile extending continuously along an entirety of the annular shaped element.

33. A bicycle wheel according to claim 12, wherein:
said annular shaped element is an extruded element comprising said box-shaped rim profile extending continuously along an entirety of the annular shaped element.

34. A rim for a cycle wheel comprising:
an annular shaped element having an outer annular channel, said annular shaped element having a structure and shape to receive and to have mounted on said outer annular channel a pneumatic tire, said structure and shape comprising a box-shaped rim profile extending continuously along an entirety of the annular shaped element;
said structure and shape of said annular shaped element comprising at least one lip extending axially toward a median plane of the rim and engaging the pneumatic tire when received in said outer annular channel;

said annular shaped element comprising at least one groove;

at least one winding encircling said annular shaped element, said winding comprising a continuous fiber coated with a polymerizable resin;

said winding being housed and exposed in one of said at least one groove of said annular shaped element.

35. A bicycle wheel comprising:

a rim;

a hub;

spokes connecting said rim and said hub;

said rim comprising:

an annular shaped element having an outer annular channel, said annular shaped element having a structure and shape to receive and to have mounted on said outer annular channel a pneumatic tire, said structure and shape comprising a box-shaped rim profile extending continuously along an entirety of the annular shaped element;

said structure and shape of said annular shaped element comprising at least one lip extending axially toward a median plane of the rim and engaging the pneumatic tire when received in said outer annular channel;

said annular shaped element comprising at least one groove;

at least one winding encircling said annular shaped element, said winding comprising a continuous fiber coated with a polymerizable resin;

said winding being housed and exposed in one of said at least one groove of said annular shaped element.

36. A rim according to claim 1, wherein:

said at least one winding comprises a plurality of windings of a fiber strand encircling the annular shaped element, said fiber strand having a first end and a second end.

37. A bicycle wheel according to claim 12, wherein:

said at least one winding comprises a plurality of windings of a fiber strand encircling the annular shaped element, said fiber strand having a first end and a second end.

38. A rim according to claim 2, wherein:

said upper bridge is partially comprised of said resin-coated fiber.

39. A method according to claim 13, wherein:

said forming the annular shaped element further comprises defining an upper bridge;

said winding around the annular shaped element comprises forming said upper bridge partially with said resin-coated fiber strand.

40. A rim according to claim 17, wherein:

said upper bridge is partially comprised of said resin-coated fiber.

41. A bicycle wheel according to claim 18, wherein:

said upper bridge is partially comprised of said resin-coated fiber.

42. A method according to claim 19, wherein:

said forming the annular shaped element further comprises defining an upper bridge;

said winding around the annular shaped element comprises forming said upper bridge partially with said resin-coated fiber strand.

43. A method according to claim 23, wherein:

said forming the annular shaped element further comprises defining an upper bridge;

said winding around the annular shaped element comprises forming said upper bridge partially with said resin-coated fiber strand.

44. A method according to claim 13, wherein:

said fiber has a modulus of elasticity greater than a modulus of elasticity of the annular shaped element.

45. A method according to claim 23, wherein:

said fiber has a modulus of elasticity greater than a modulus of elasticity of the annular shaped element.

46. A rim according to claim 2, wherein:

said at least one winding of resin-coated fiber does not extend radially outwardly beyond the two side walls.

47. A rim according to claim 17, wherein:

said at least one winding of resin-coated fiber does not extend radially outwardly beyond the two side walls.

48. A bicycle according to claim 18, wherein:

said at least one winding of resin-coated fiber does not extend radially outwardly beyond the two side walls.

49. A rim according to claim 26, wherein:

said at least one winding of resin-coated fiber does not extend radially outwardly beyond the two side walls.

50. A method according to claim 19, wherein:

said winding a plurality of windings of a fiber strand leaves said fiber strand exposed at least prior to a tire being mounted on the rim.

51. A rim according to claim 23, wherein:

said fiber strand is exposed at least prior to a tire being mounted on the rim.

52. A method according to claim 19, wherein:

said forming the annular shaped element by extruding a bar comprises forming the annular shaped element by extruding a bar of aluminum or aluminum alloy.

53. A rim according to claim 23, wherein:

said annular extruded element comprises aluminum or an aluminum alloy.

* * * * *